US006650899B1

(12) United States Patent
Stümpert

(10) Patent No.: US 6,650,899 B1
(45) Date of Patent: Nov. 18, 2003

(54) METHOD FOR A HANDOVER BETWEEN DIFFERENT NODES IN A MOBILE COMMUNICATION SYSTEM

(75) Inventor: Martin Stümpert, Hochspeyer (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 421 days.

(21) Appl. No.: 09/711,592

(22) Filed: Nov. 13, 2000

(30) Foreign Application Priority Data

Nov. 15, 1999 (EP) .............................. 99122660

(51) Int. Cl.[7] ................................. H04Q 7/20
(52) U.S. Cl. ...................... 455/436; 455/426
(58) Field of Search ................ 455/436, 439, 455/438, 426, 452, 453; 370/331

(56) References Cited

U.S. PATENT DOCUMENTS

| 5,911,122 A | * | 6/1999 | Corriveau et al. ......... | 455/436 |
| 6,115,608 A | * | 9/2000 | Duran et al. ................ | 455/436 |
| 6,125,276 A | * | 9/2000 | Lupien ....................... | 455/436 |
| 6,230,005 B1 | * | 5/2001 | Le et al. .................... | 455/436 |
| 6,385,451 B1 | * | 5/2002 | Kalliokulju et al. ........ | 455/439 |
| 6,501,953 B1 | * | 12/2002 | Braun et al. ................ | 455/436 |

FOREIGN PATENT DOCUMENTS

| FI | 981 041 A | 11/1999 |
| WO | Wo 99 59364 A | 11/1999 |

OTHER PUBLICATIONS

Heinrich, D., European Search Report, App. No. EP 99 12 2660, May 18, 2000, pp. 1–3.

"Information Element Mapping Between Mobile Station—Base Station System (MS–BSS) and Base Stations System—Mobile Services Switching Centre (BSS–MSC); Signalling Procedures and the Mobile Application part (MAP), (3G TS 29.010 Version 3.0.0)", Third Generation Partnership Project; Technical Specification Group Core Network, Sep. 1999, pp. 1–41, Sophia Antipolis, France.

Third Generation Partnership Project; Technical Specification Group Core Network; Application of the Radio Access Network Application Part (RANAP) on the E–interface (3G TS 29.108 version 1.0.0 Release 1999), May 2000, pp. 1–12, Sophia Antipolis, France.

* cited by examiner

Primary Examiner—Lee Nguyen

(57) ABSTRACT

A method for a handover of user equipment in a mobile communication system from a first base station subsystem controlled by a first switching node to a second base station subsystem controlled by a second switching node. The equipment is capable of connections to base stations according to at least two connection specifications and the communication system has different base station subsystems for connection to the user equipment using one of the specifications. The second switching node controls the second base station subsystem using a protocol corresponding to the connection specification used on the interface between the base station subsystem and the user equipment. The switching nodes exchange messages in the handover procedure which encapsulates a parameter set for one of the protocols and the parameter set is generated in the first switching node from a message which is transmitted from the user equipment to the first switching node. The first switching node detects out of a message. transmitted from the user equipment whether the user equipment is capable of connections according to different specifications and selects the parameter set encapsulated in the message to the second switching node according to the protocol for the connection of the second switching node to the second base station subsystem. Switching nodes and programs are also described.

19 Claims, 3 Drawing Sheets

METHOD FOR A HANDOVER BETWEEN DIFFERENT NODES IN A MOBILE COMMUNICATION SYSTEM

TECHNICAL FIELD OF THE INVENTION

The present invention relates generally to a mobile communication system; and, more particularly, to a method, a switching node and a program for the handover of user equipment from a first base station subsystem controlled by a first switching node to a second base station subsystem controlled by a second switching node, and which provides the second base station subsystem with the required parameters for the handover.

BACKGROUND OF THE INVENTION

When a user moves through a cellular communication system or requests a connection with different parameters it is often necessary to perform a handover of user equipment from a first base station subsystem in the communication system to a second base station subsystem. In the handover, a connection of the user equipment, e.g. a mobile phone, to the second base station subsystem is established and the connection to the first base station subsystem is generally released. Customary base station subsystems comprise one or several base stations for the wireless connection to the user equipment and a base station controller which controls the base stations and connects them to the core network of the communication system. The controller can be for example a base station controller (BSC) as defined in GSM or a radio network controller (RNC) for a base station subsystem according to the UMTS standard.

A base station subsystem, i.e. the controller, is in turn controlled by a switching node, e. g. a mobile switching center (MSC). A switching node is connectable or permanently connected to a base station subsystem with a protocol corresponding to the connection specification used between the base station subsystem and the user equipment. For a connection according to the UMTS standard, the RANAP (Radio Access Network Application Protocol) protocol is exchanged over the Iu interface between the switching node and the controller in the base station subsystem while GSM subsystems use the BSSMAP (Base Station System Management Application Part) protocol over the A interface to the switching node. Correspondingly, an MSC in a GSM system generally exchanges only BSSMAP messages with a BSC while a 3G MSC in a UMTS system processes RANAP messages. A 3G MSC can normally also process BSSMAP messages and can be connected to a BSC according to GSM specifications over an A interface.

Frequently, a handover is necessary between base station subsystems which are controlled by different switching nodes. In this case, the switching nodes exchange messages to perform the handover procedure of the user equipment from the first base station subsystem to the second base station subsystem which is controlled by a second switching node. The messages are described in 3GPP technical specification 3G TS 29.010 V 3.0.0. They encapsulate a set of parameters used in the protocol between the switching nodes and the base station subsystem. The set is necessary to perform the handover and comprises an identification of the connection for which the handover is to be executed and parameters which are required to provide defined services to the user. The necessary parameters for different types of connections, especially speech and data connections can differ.

For communication between switching nodes and transfer of the parameter set, MAP (Mobile Application Part) messages as described in 3GPP Technical Specification 29.002 V 3.2.0 are suitable which allow to encapsulate BSSMAP messages. The parameter set is generated in the first switching node. serving the user equipment from a message which is transmitted from the user equipment to the first switching node. The latter message which is generally in the DTAP (Direct Transfer Application Part) protocol is forwarded by the first base station subsystem without evaluation.

On the interface to the base station subsystem, user equipment is often capable of a connection according to at least two connection specifications, e.g. according to the standards for the GSM and UMTS air interfaces. User equipment which can set up connections according to further standards, e.g. DECT (Digital European Cordless Telecommunications) or WLAN (Wireless Local Area Network), in addition to at least one of these or other connection specifications is also possible. Correspondingly, many communication systems comprise base station subsystems for connection to the user equipment wherein different subsystems use different connection specifications on the interface to the user equipment.

The necessary parameters in the set used in the protocol between a switching node and a base station subsystem are dependent on the connection specification between the user equipment and the base station subsystem because the protocol is adapted to the connection specification, i.e. the interface between base station and user equipment. The messages over a specific interface comprise mandatory fields which have to be filled in from the parameter set. Parameter sets for different protocols comprise different mandatory parameters. Consequently, the connection will be lost in an intersystem handover if the parameters necessary for the handover are not provided. This problem is aggravated if the movements of the user require a repeated handover between connections of different specifications. An additional problem is that the handover between different switching nodes requires a considerable time which can also lead to a disruption of the connection.

SUMMARY OF THE INVENTION

It is therefore an object of the present invention to obviate these disadvantages and provide a method for the handover between base station subsystems controlled by different switching nodes which provides the target subsystem with the required parameters for the handover. It is a further object, to provide a method which is simple and easy to implement. It is still another object to provide a method which performs the handover in a short time.

According to the invention, a method is provided for a handover of user equipment in a mobile communication system from a first base station subsystem controlled by a first switching node to a second base station subsystem controlled by a second switching node. The user equipment is capable of connections to base stations according to at least two connection specifications, and the communication system comprises different base station subsystems for connection to the user equipment using one of the at least two connection specifications. The second switching node controls the second base station subsystem using a protocol corresponding to the connection specification used on an interface between the base station subsystem and the user equipment. The switching nodes exchange messages in the handover which encapsulates a parameter set for one of the protocols, the parameter set is generated in the first switching node from a message which is transmitted from the user equipment to the first switching node, the first switching node detects out of a message transmitted from the user equipment whether the user equipment is capable of connection according to different specifications, and the first switching node selects the parameter set encapsulated in the message to the second switching node according to the protocol for the connection of the second switching node to the second base station subsystem.

In the proposed method, the first switching node determines from a message transmitted from the user equipment whether the user equipment is capable of connections according to different specifications. The user equipment can be for example a mobile phone, a personal digital assistant (PDA) or a palmtop computer which is connectable to the communication network according to different specifications, e.g. with a GSM or UTRAN (UMTS Terrestrial Radio Access Network) and a WLAN connection. Preferably, the evaluated message is a DTAP message from the user equipment to the first switching node during the idle mode of the user equipment before a connection or during the establishment of the connection. The evaluated message can be the message which is used for the generation of the parameter set transmitted in the handover procedure.

The first switching node selects the parameter set encapsulated in the message to the second switching node according to the protocol for the connection of the second switching node to the target base station subsystem, i.e. the subsystem to which the handover procedure of the user equipment is performed. If both base station subsystems use the same connection specification on the interface to the user, the protocol corresponding to this connection specification is selected and encapsulated in the messages between the switching nodes. Else the selection depends on the implementations described below. It is either possible to generate only the selected parameter set or to generate different parameter sets and select one of them for encapsulation.

It is often suitable to encapsulate the set of parameters in a specific message type, e.g. a RANAP message, for which the encapsulation into a MAP message is not defined in present standards. However, because a MAP message can enclose different message types it is sufficient for this purpose to amend the list of allowed message types for encapsulation in MAP messages by the specific type. The message type contained in the MAP message is indicated by a data field in the header of the MAP message which can then be set to the specific message type enclosed from the amended list. In this way, also RANAP messages or further message specifications can be encapsulated into a MAP message and processed by the target switching node.

The proposed method has the advantage that it is simple to implement and ensures a safe execution of the handover procedure. The selection of the parameter set ensures that the target base station subsystem is provided with the parameters necessary for the establishment of the connection to the user equipment. Disruptions of a connection due to a handover of the user equipment between base station subsystems using different connection specifications are avoided.

In a preferred embodiment, the first switching node serving the user equipment generates parameter sets for different protocols. Advantageously, a parameter set corresponding to every connection specification to which a handover is possible is generated. The parameter sets are stored in the first switching node. Upon the request of a handover to a target base station subsystem controlled by the target node, the parameter set according to the target base station subsystem is encapsulated in the message and sent to the target switching node. In this way, the time for the execution of the handover is reduced and the risk for a disruption of a connection during handover is diminished.

Preferably, the first switching node serving the user equipment generates all parameter sets from a message transmitted from the user equipment. In this way, a mapping between parameter sets for different types of messages, for example BSSMAP and RANAP messages, is avoided. An advantage is that those parameters which are defined only in one of the messages are not lost during the mapping procedure and need not to be replaced by default values.

Alternatively, a switching node maps the parameter set for one protocol from a parameter set for a different protocol. The mapping can either be performed in the switching node first serving the user or in the target switching node of a handover. The latter embodiment is preferable if only a small number of nodes is connected to base station subsystems of a defined specification, for example base stations for a connection specification used mainly for indoor cells like the DECT or WLAN standards. Adaptations of other control nodes in the communication system to the specific specification can be avoided.

Preferably, all messages encapsulating parameter sets to further switching nodes in subsequent handover procedures are sent from the first switching node, i.e. the first node serves as an anchor node. Consequently, the parameters for every handover of a connection between different switching nodes are sent from the node which first served the user equipment in the connection. The embodiment is especially suitable if the parameter sets are generated in the first node from a message originating directly, i.e. without mapping, from the user equipment.

The latter embodiment is also suitable, if the second and the further switching node are identical or collocated and control base station subsystems using different protocols. In this way a mapping in the further handover with a corresponding loss of information is avoided. If the first switching node serves as anchor node of the connection, the signaling load in the communication system is only slightly increased as every subsequent handover is communicated to the anchoring node.

The parameter set encapsulated in the message between the switching nodes corresponds preferably to the protocol used between the second switching node and the second base station subsystem. In this way, the target switching node can relay the encapsulated parameter set without change of the protocol in a minimum time. If for example the handover is performed to a base station subsystem controlled by a BSC, a suitable message is a MAP message encapsulating a BSSMAP massage with the parameter set. In case of a handover to a base station subsystem controlled by an RNC, preferably a MAP message encapsulates a RANAP message comprising the parameter set. Advantages of this embodiment are the short length of the messages between the switching nodes and that all parameter sets can be generated in the first switching node serving the user equipment out of the parameters sent by the user equipment, e.g. in a DTAP message.

Alternatively, the parameter set is sent according to a predefined protocol which can be processed by any switching node in the communication system. If the communication system is updated and a new type of protocol introduced the predefined protocol is a protocol which is already used in all switching nodes of the system. For example, in a GSM system which is updated with UMTS nodes and comprises both types of nodes, the preferable predefined protocol is the BSSMAP protocol. The receiving switching node maps the parameter set to the protocol for the control of the second base station subsystem. Generally, a mapping is performed only in the target node. The embodiment is advantageous if base station subsystems according to an additional communication specification or only few base station subsystems according to a specific communication specification are connected to the communication system because only the switching nodes connectable to these base station subsystems need to perform a mapping. The protocol between the switching nodes needs not to be changed. The flexibility of this embodiment is limited by the parameters in the set according to the default protocol.

In a further alternative, the parameter set is sent for the predefined protocol and a parameter set for a further protocol is encapsulated in an extension field of the predefined protocol if the further protocol is used between the target switching node and the target base station subsystem. It is possible to encapsulate the parameter set for the further protocol in a message according to the further protocol which is in turn encapsulated in the extension field. This simplifies the handling of the parameters in the target switching node. If the predefined protocol is used between the target switching node and the target base station subsystem no parameters for a further protocol need to be encapsulated. As an example, the BSSMAP message comprises an extension field which can contain a RANAP message or the parameters according to a RANAP message. If the predefined protocol is the BSSMAP protocol and the handover is performed to a base station subsystem controlled by an RNC, the MAP message between the switching nodes encapsulates a BSSMAP message with a further RANAP message or a RANAP parameter set encapsulated in the extension field of a BSSMAP message. If the handover is performed to a base station subsystem controlled by a BSC, the MAP message between the switching nodes encapsulates an ordinary BSSMAP message. In this way all necessary parameters are transferred to the second or further switching node at the expense of an increased length of the messages. The target node performs a message extraction or a mapping to the message according to the required specification for the base station subsystem.

Generally, in sets of parameters corresponding to different protocols a first group of parameters have to be set to default values in a mapping between the parameter sets while other parameters are identical in both sets or can be calculated from parameters in the other set without loss of information. To reduce the number of parameters in the extension field and the length of the message containing the parameter set, the first group of parameters according to the further protocol is encapsulated in the extension field. For parameters which are identical in both parameter sets the target switching node performs a mapping from the predefined protocol to the protocol for the control of the second base station subsystem. For parameters which can be calculated from parameters in the other set, the preferable handling depends on the computing expense and additional length of the messages, i.e. these parameters can be either mapped or included in the extension field.

A preferable switching node can be used in a mobile communications system with further switching nodes and user equipment connectable to base station subsystems according to different connection specifications. The switching node comprises means for the control of a first base station subsystem and a first interface for the connection to the first base station subsystem with a protocol corresponding to the connection specification used on the interface between the base station subsystem and the user equipment. A second interface is provided for the exchange of messages with at least one further switching node in a handover procedure of user equipment from the first base station subsystem to a second base station subsystem which is controlled by the further switching node. The message can encapsulate a parameter set for the connection protocol between the second base station subsystem and the further switching node. The switching node has furthermore means to generate the parameter set from a message which is transmitted from the user equipment and means to detect out of this or a different message transmitted from the user equipment whether the user equipment is capable of connections according to different connection specifications on the interface to a base station subsystem. The switching node selects the parameter set encapsulated in the message to the second switching node according to the protocol for the connection of the second switching node to the base station subsystem to which the handover procedure of the user equipment is performed. It is possible to select which set is generated for encapsulation or select a set from several ones generated before. Generally, the switching node comprises a processor system. which allows to embody all of the means described as software programs.

Preferably, the switching node comprises means to generate parameter sets for different protocols and a memory to store the sets. This embodiment allows a reduced handover duration.

Furthermore, a preferable node comprises means to generate parameter sets from a message transmitted from the user equipment or means to map the parameter set for one protocol to a parameter set for a different protocol.

It is proposed that the switching node comprises means to encapsulate a parameter set for a first connection specification into a message for a second connection specification and/or to extract a parameter set for a first connection specification out of a message for a second connection specification. The encapsulated parameter set may be a subset of the parameters necessary for the handover if remaining parameters can be mapped from the message according to the second specification. Correspondingly, messages of the second specification can be used, especially as default message type, without loosing information in mapping procedures and with reduced restrictions from limitations of the second connection specification.

A program unit according to the invention can be stored on a data carrier or be loadable into a switching node for the control of base station subsystems in a communication system. The program unit is preferably part of a program which is executed in the handover of user equipment from a first base station subsystem to a second base station subsystem which is controlled by a second switching node in a communication system comprising base station subsystems differing in the connection specification on the interface to the user equipment. The switching node controls a base station subsystem with a protocol corresponding to the connection specification for the interface between the base station subsystem and the user equipment. The program unit comprises means, e.g. routines or subroutines, to exchange messages in the handover procedure with the second switching node, said message encapsulating a parameter set for one of said protocols and means to generate the parameter set from a message which is transmitted from the user equipment to the switching node. The program unit checks a message transmitted from the user equipment whether the user equipment is capable of connections according to different specifications. It selects the parameter set encapsulated in the message to the second switching node according to the protocol for the connection of the second switching node to the base station subsystem to which the handover procedure of the user equipment is performed. The program unit can perform any steps of the methods described above.

The foregoing and other objects, features and advantages of the present invention will become more apparent in the following detailed description of preferred embodiments as illustrated in the accompanying drawings.

DETAILED DESCRIPTION OF THE INVENTION

Figure 1:
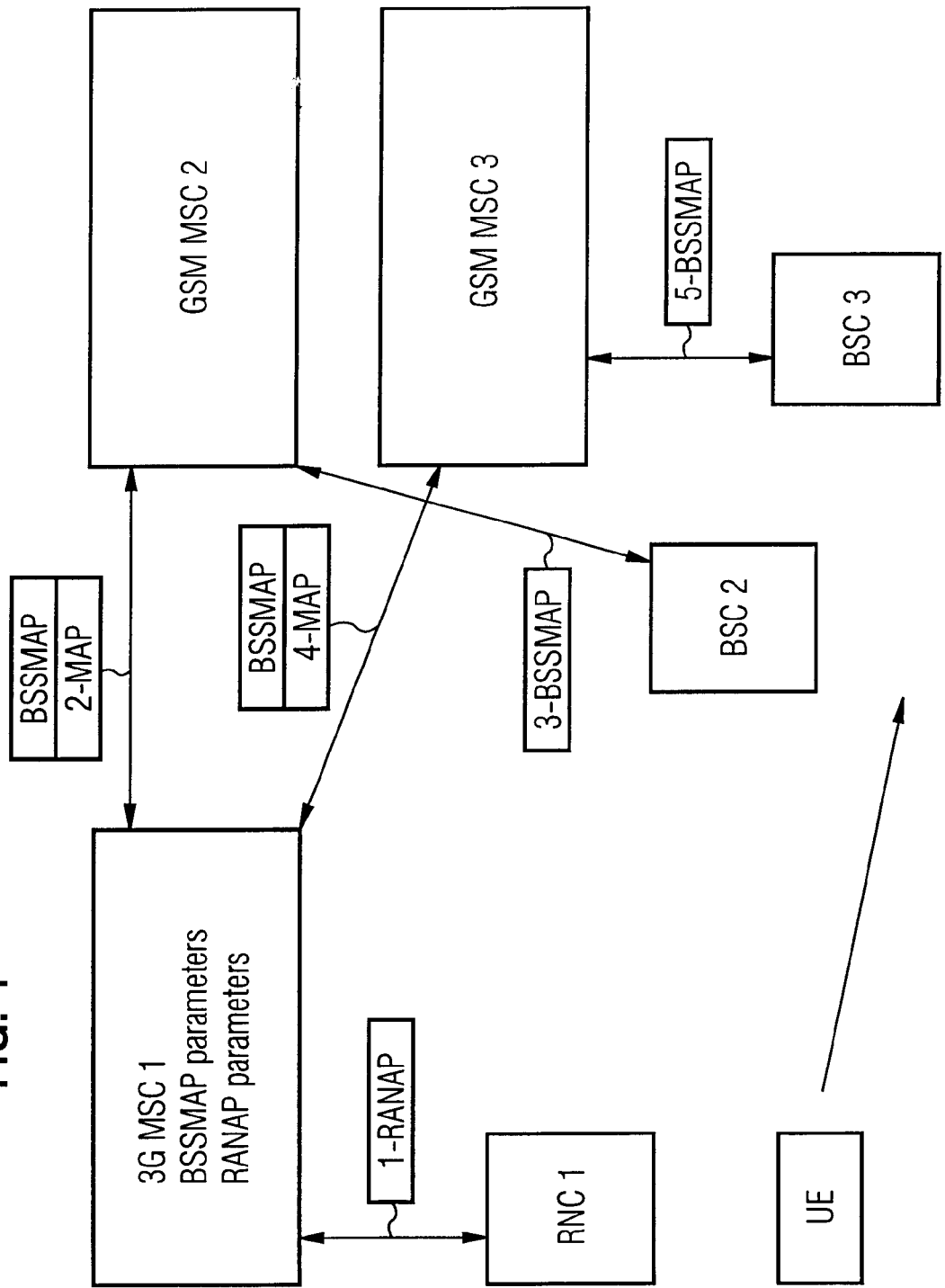
FIG. 1 shows a schematic representation of nodes in a communication system wherein a method according to the invention is performed.

In the communication system depicted in FIG. 1, user equipment UE is connected to a first base station subsystem which is controlled by a radio network controller RNC1. To simplify the drawing, only the controller in the base station system is shown. The controller RNC1 is in turn connected to a switching node 3G MSC1 with a connection 1 over an Iu interface. Over the Iu interface, RANAP messages between the switching node 3G MSC and the controller RNC1 and DTAP messages can be exchanged. DTAP messages are sent between the switching node and the user equipment UE and forwarded by the controller RNC1 without evaluation. The DTAP messages comprise an indication which connection specifications can be processed by the user equipment.

When a DTAP message sent by the user equipment UE indicates, that the equipment can process different connection specifications used in the communication system, the control node 3G MSC1 generates and stores parameter sets for a handover to base station subsystems which use these specifications for connection to the user equipment. On the connections 1, 3, 5 between the control nodes 3G MSC1, GSM MSC2, GSM MSC3 and the controllers RNC1, BSC2, BSC3 in the base station subsystems, BSSMAP messages are used when the connection on the interface to the user equipment corresponds to the GSM standard, i.e. the controller is denoted as BSC, and RANAP messages are used if the connection corresponds to the UMTS standard, i.e. the controller is denoted as RNC. This denotation principle applies also to the connections 11, 13, 15, 21, 23, 25 in the other figures. In all figures, a node which is denoted as 3G MSC can process both RANAP messages and BSSMAP messages in addition to DTAP messages while a GSM MSC processes only BSSMAP messages in addition to DTAP messages.

When the user equipment UE moves into a region served by a second base station subsystem with a controller BSC2 as indicated by the arrow, a handover of the connection to the second base station subsystem is performed. The handover is executed by the following signaling sequence wherein the connection over which the message is sent is denoted in parentheses and the message types are used as in proposed specification 3G TS 29.010 V 3.0.0:
(connection 1) RELOCATION REQUIRED
(connection 2) MAP PREPARE HANDOVER REQUEST (HANDOVER REQUEST)
(connection 3) HANDOVER REQUEST
(connection 3) HANDOVER REQUEST ACKNOWLEDGE
(connection 2) MAP PREPARE HANDOVER RESPONSE (HANDOVER REQUEST ACKNOWLEDGE)
(connection 1) RELOCATION COMMAND
(connection 3) HANDOVER DETECT
(connection 2) MAP PROCESS ACCESS SIGNALING REQUEST (HANDOVER DETECT)
(connection 3) HANDOVER COMPLETE
(connection 2) MAP SEND END SIGNAL REQUEST (HANDOVER COMPLETE)
(connection 1) IU RELEASE COMMAND/COMPLETE In the message RELOCATION REQUIRED, the target base station system for the handover is indicated as target base station subsystem or as target cell. Therefore, the switching node 3G MSC1 is provided with the information which protocol is used on the connection 3 between the switching node GSM MSC2 and the target controller BSC2. In the example, the controller BSC2 corresponds to the GSM standard and BSSMAP messages sent over a GSM A interface are used on the connection 3. Therefore, the MAP PREPARE HANDOVER REQUEST (HANDOVER REQUEST) comprises a parameter set for the execution of the handover which is selected according to the protocol on connection 3. For this purpose, the parameter set for a BSSMAP message is selected from the memory of switching node 3G MSC1 and encapsulated in the MAP message on connection 2. As in all figures, the encapsulated message type is indicated in a box stacked on the box denoting the connection and protocol type used on the respective connection.

If a handover of the user equipment is required to a further base station system with a controller BSC3 which is controlled by the switching node GSM MSC3, the following message sequence is executed:
(connection 3) HANDOVER REQUIRED
(connection 2) MAP PREPARE SUBSEQUENT HANDOVER REQUEST (HANDOVER REQUEST)
(connection 4) MAP PREPARE HANDOVER REQUEST (HANDOVER REQUEST)
(connection 5) HANDOVER REQUEST
(connection 5) HANDOVER REQUEST ACKNOWLEDGE
(connection 4) MAP PREPARE HANDOVER RESPONSE (HANDOVER REQUEST ACKNOWLEDGE)
(connection 2) MAP PREPARE SUBSEQUENT HANDOVER RESPONSE (HANDOVER REQUEST ACKNOWLEDGE)
(connection 3) HANDOVER COMMAND
(connection 5) HANDOVER DETECT
(connection 4) MAP PROCESS ACCESS SIGNALING REQUEST (HANDOVER DETECT)
(connection 5) HANDOVER COMPLETE
(connection 4) MAP SEND END SIGNAL REQUEST (HANDOVER COMPLETE)
(connection 2) MAP SEND END SIGNAL RESPONSE (HANDOVER COMPLETE)
(connection 3) CLEAR COMMAND/COMPLETE All parameters in the example are provided from the first node serving the user equipment UE in a connection.

Therefore, the message MAP PREPARE SUBSEQUENT HANDOVER REQUEST (HANDOVER REQUEST) is sent to the switching node 3G MSC1. Because the target base station system for the handover indicated in this message is the controller BSC3 corresponding to the GSM standard, BSSMAP messages sent over a GSM A interface are used on the connection 5. The parameter set for the execution of the handover is selected in the switching node 3G MSC1 according to the protocol on connection 5. Therefore, the parameter set for a BSSMAP message is selected from the memory of switching node 3G MSC1 and encapsulated in the MAP PREPARE HANDOVER REQUEST (HANDOVER REQUEST) on connection 4. In addition to the handover procedures described above, generally additional handover procedures are also performed between base station systems served by the same switching node. The execution of the latter handover procedures as well as the execution of those steps of the handover procedures performed in the base station subsystems to execute the commands received by the control nodes are known to a skilled. person.

Figure 2:
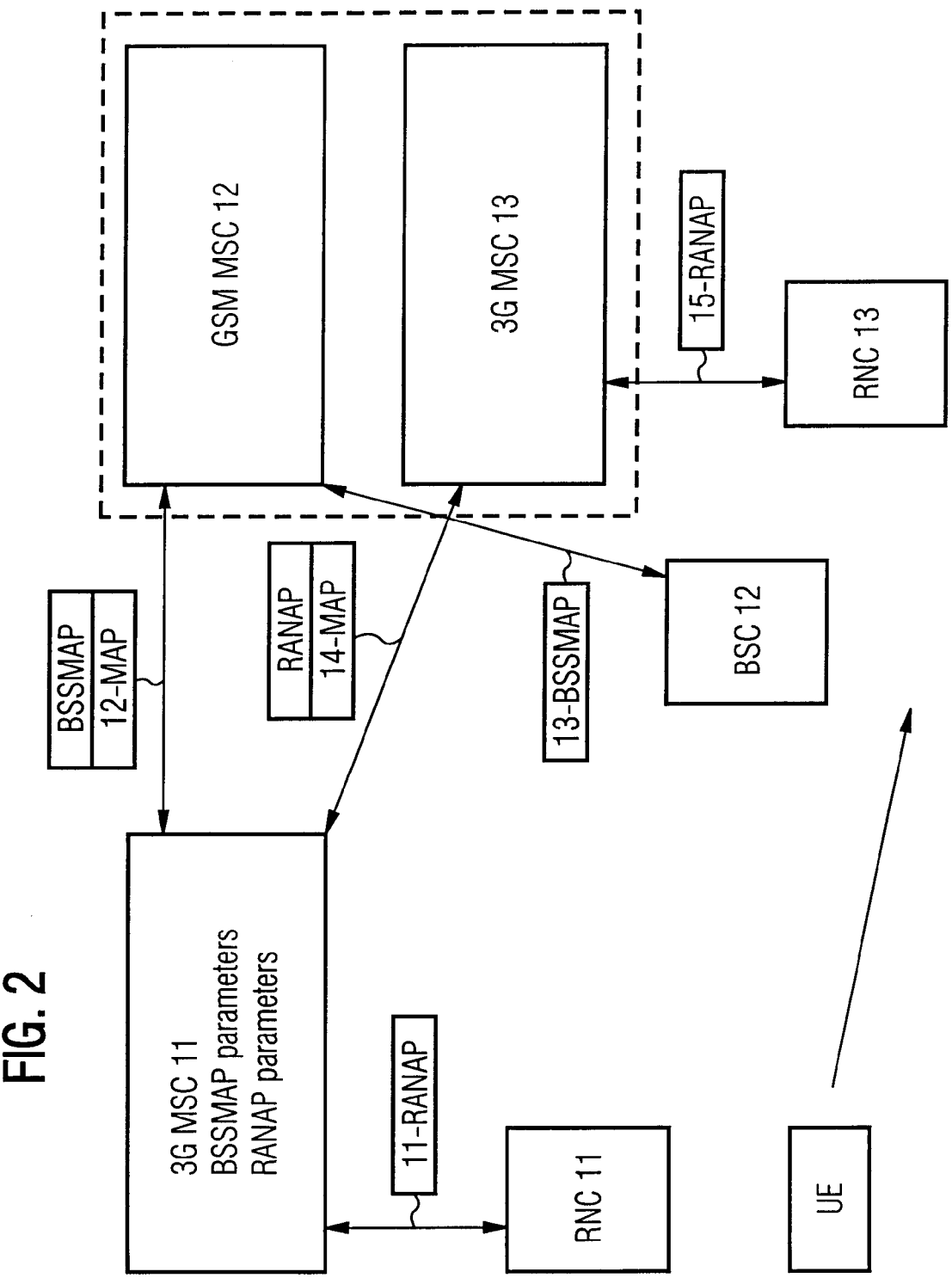
FIG. 2 shows a schematic representation of an alternative arrangement of nodes in a communication system wherein a method according to the invention is performed.

In FIG. 2, a second example for a handover sequence according to the invention is depicted for a different arrangement of control nodes. In a first handover from a first base station subsystem with controller RNC11 using a UMTS air interface specification for the connection with the user equipment to a second base station subsystem with controller BSC12 using a GSM air interface specification for the connection to the user equipment, the following messaging sequence is executed. The links over which the messages are sent are indicated in brackets.
(connection 11) RELOCATION REQUIRED
(connection 12) MAP PREPARE HANDOVER REQUEST (HANDOVER REQUEST)
(connection 13) HANDOVER REQUEST
(connection 13) HANDOVER REQUEST ACKNOWLEDGE
(connection 12) MAP PREPARE HANDOVER RESPONSE (HANDOVER REQUEST ACKNOWLEDGE)
(connection 11) RELOCATION COMMAND
(connection 13) HANDOVER DETECT
(connection 12) MAP PROCESS ACCESS SIGNALING REQUEST (HANDOVER DETECT)
(connection 13) HANDOVER COMPLETE
(connection 12) MAP SEND END SIGNAL REQUEST (HANDOVER COMPLETE)
(connection 11) IU RELEASE COMMAND/COMPLETE In a subsequent handover from second base station subsystem with controller BSC12 to a further base station subsystem with controller RNC13 using a UMTS air interface specification for the connection to the user equipment, the following messaging sequence is executed. As indicated by the broken lines, the switching nodes GSM MSC12 and 3G MSC13 controlling the nodes are collocated or different logical nodes in a single physical node, i.e. the switching nodes GSM MSC12 and 3G MSC13 can be different interfaces of a single device.
(connection 13) HANDOVER REQUIRED
(connection 12) MAP PREPARE SUBSEQUENT HANDOVER REQUEST (HANDOVER REQUEST)
(connection 14) MAP PREPARE HANDOVER REQUEST (RELOCATION REQUEST)
(connection 15) RELOCATION REQUEST
(connection 15) RELOCATION REQUEST ACKNOWLEDGE
(connection 14) MAP PREPARE HANDOVER RESPONSE (RELOCATION REQUEST ACKNOWLEDGE)
(connection 12) MAP PREPARE SUBSEQUENT HANDOVER RESPONSE (HANDOVER REQUEST ACKNOWLEDGE)
(connection 13) HANDOVER COMMAND
(connection 15) RELOCATION DETECT
(connection 14) MAP PROCESS ACCESS SIGNALING REQUEST (RELOCATION DETECT)
(connection 15) RELOCATION COMPLETE
(connection 14) MAP SEND END SIGNAL REQUEST (RELOCATION COMPLETE)
(connection 12) MAP SEND END SIGNAL RESPONSE (HANDOVER COMPLETE)
(connection 13) CLEAR COMMAND/COMPLETE As the parameters are always transferred from node 3G MSC1, a loss of information due to mapping procedures is avoided.

Figure 3:
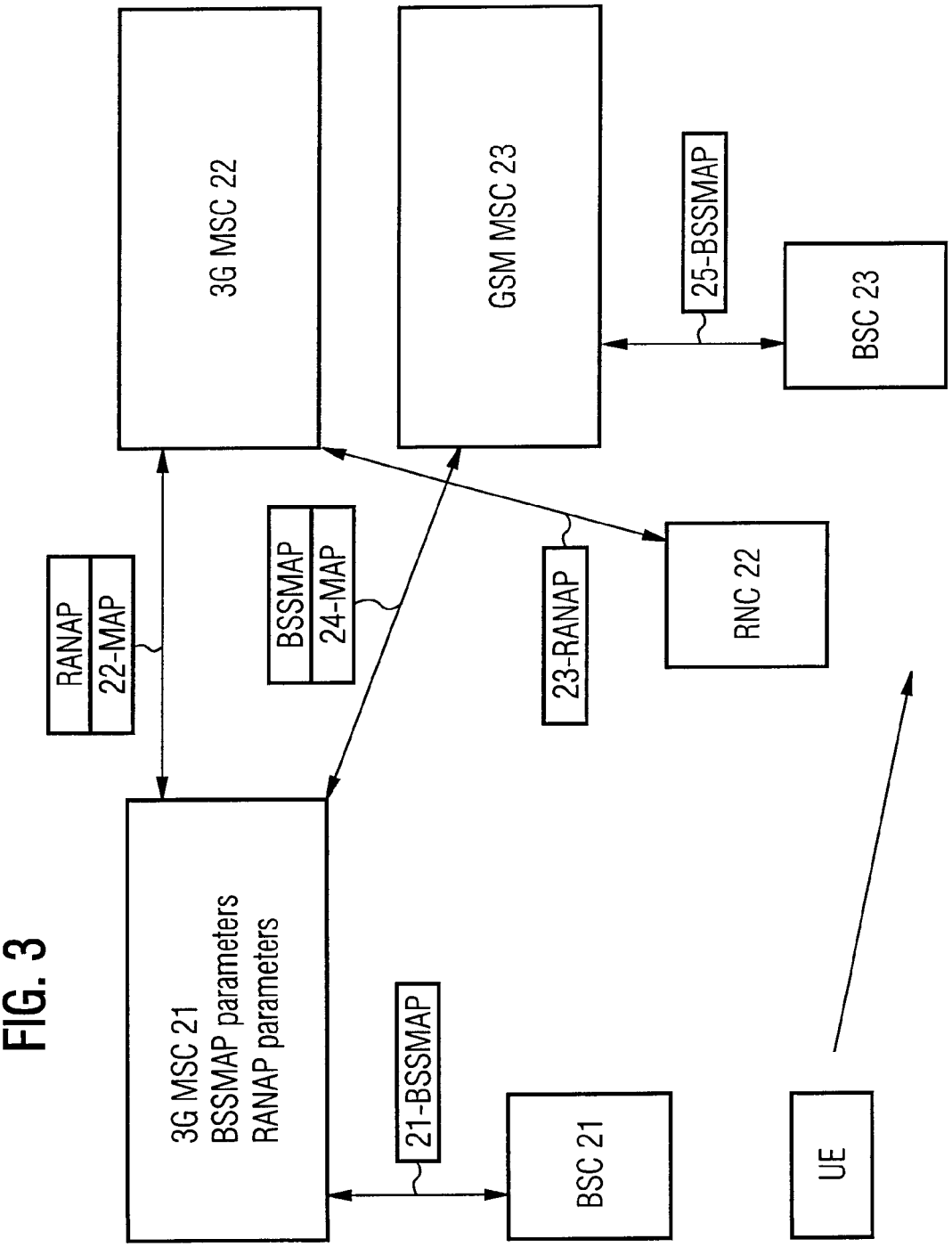
FIG. 3 shows a schematic representation of a further arrangement of nodes in a communication system wherein a method according to the invention is performed.

In FIG. 3, an example for a handover sequence according to the invention is depicted for a further arrangement of control nodes. Here, the first base station subsystem with controller BSC21 using a GSM air interface specification for the connection to the user equipment is connected to the controlling node 3G MSC 21 over a connection 21 on which BSSMAP messages are sent over A interfaces. However, the controlling node 3G MSC 21 can also process RANAP messages. In a first handover to a second base station subsystem with controller RNC22 using a UMTS air interface specification for the connection to the user equipment, the following messaging sequence is executed. The MAP PREPARE HANDOVER REQUEST (RELOCATION REQUEST) on connection 22 comprises a RANAP message according to the RANAP protocol used on the connection 23 between 3G MSC 22 and RNC 22. As before, the links over which the messages are sent are indicated in brackets.
(connection 21) HANDOVER REQUIRED
(connection 22) MAP PREPARE HANDOVER REQUEST (RELOCATION REQUEST)
(connection 23) RELOCATION REQUEST
(connection 23) RELOCATION REQUEST ACKNOWLEDGE
(connection 22) MAP PREPARE HANDOVER RESPONSE (RELOCATION REQUEST ACKNOWLEDGE)
(connection 21) HANDOVER COMMAND
(connection 23) RELOCATION-DETECT
(connection 22) MAP PROCESS ACCESS SIGNALING REQUEST (RELOCATION DETECT)
(connection 23) RELOCATION COMPLETE
(connection 22) MAP SEND END SIGNAL REQUEST (RELOCATION COMPLETE)
(connection 21) CLEAR COMMAND/COMPLETE If the a handover of the user equipment is required to a further base station system with a controller BSC23 and controlled by switching node GSM MSC23, the following message sequence is executed with a MAP PREPARE HANDOVER REQUEST (HANDOVER REQUEST) including a BSSMAP message with the parameter set for connection 25:
(connection 23) RELOCATION REQUIRED
(connection 22) MAP PREPARE SUBSEQUENT HANDOVER REQUEST (RELOCATION REQUEST)
(connection 24) MAP PREPARE HANDOVER REQUEST (HANDOVER REQUEST)
(connection 25) HANDOVER REQUEST
(connection 25) HANDOVER REQUEST ACKNOWLEDGE
(connection 24) MAP PREPARE HANDOVER RESPONSE (HANDOVER REQUEST ACKNOWLEDGE)

(connection 22) MAP PREPARE SUBSEQUENT HANDOVER RESPONSE (RELOCATION REQUEST ACKNOWLEDGE)
(connection 23) RELOCATION COMMAND
(connection 25) HANDOVER DETECT
(connection 24) MAP PROCESS ACCESS SIGNALING REQUEST (HANDOVER DETECT)
(connection 25) HANDOVER COMPLETE
(connection 24) MAP SEND END SIGNAL REQUEST (HANDOVER COMPLETE)
(connection 22) MAP SEND END SIGNAL RESPONSE (RELOCATION COMPLETE)
(connection 23) IU RELEASE COMMAND/COMPLETE In this way, any handover sequence between any combination of base station subsystems according to GSM and UMTS specifications can be performed. If for example all switching nodes and base station subsystem controllers correspond to UMTS specifications and can process RANAP messages, preferably on all connections between the switching nodes and the base station subsystem controllers RANAP messages are used while on all links between switching nodes, MAP messages encapsulating RANAP messages are preferable.

The above embodiments admirably achieve the objects of the invention. However, it will be appreciated that departures can be made by those skilled in the art without departing from the scope of the invention which is limited only by the claims. Especially, the invention is not restricted to the protocols and specifications described in the examples above but can be used with any connection specification suitable for the connection of user equipment to base stations and corresponding protocols for the control of the base station systems.

What is claimed is:

1. A method for a handover of user equipment in a mobile communication system from a first base station subsystem controlled by a first switching node to a second base station subsystem which is controlled by a second switching node, wherein the user equipment is capable of connections to base stations according to at least two connection specifications, wherein the communication system comprises different base station subsystems for connection to the user equipment using one of the connection specifications, and wherein the second switching node controls the second base station subsystem using a protocol corresponding to the connection specification used on an interface between the second base station subsystem and the user equipment, the method comprising:

the first and second switching nodes adapted to exchange messages in a handover procedure, the messages encapsulating a parameter set for the protocol, the handover procedure comprising:

generating the parameter set in the first switching node from a first message which is transmitted from the user equipment to the first switching node;

the first switching node detecting out of a second message transmitted from the user equipment whether the user equipment is capable of connections according to different connection specifications; and the first switching node selecting the parameter set encapsulated in a message to the second switching node according to the protocol for the connection of the second switching node to the second base station subsystem.

2. The method according to claim 1 wherein the first switching node generates parameter sets for different protocols.

3. The method according to claim 2, wherein the first switching node generates the parameter sets from the message transmitted from the user equipment.

4. The method according to claim 2, wherein the protocol comprises a predefined protocol, and the parameter set is sent for the predefined protocol, and a parameter set for a further protocol is encapsulated in an extension field of the predefined protocol.

5. The method according to claim 4, wherein the parameter set for the further protocol is encapsulated in a message according to the further protocol which is encapsulated in the extension field.

6. The method according to claim 4, wherein a first group of parameters according to the further protocol is encapsulated in the extension field, and the second switching node performs a mapping of a second group of parameters from the predefined protocol to the protocol for the control of the second base station subsystem.

7. The method according to claim 1, wherein a switching node maps the parameter set for one Protocol to a parameter set for a different protocol.

8. The method according to claim 1, wherein a message encapsulating a parameter set for a subsequent protocol to a further switching node in a subsequent handover is sent from the first switching node, the subsequent protocol selected from a group consisting of the protocol and a further protocol.

9. The method according to claim 8, wherein the second switching node and the further switching node are identical or collocated and control base station subsystems using different protocols.

10. The method according to claim 1, wherein the parameter set encapsulated in the message between the first and second switching nodes corresponds to the protocol used between the second switching node and the second base station subsystem.

11. The method according to claim 1, wherein the protocol comprises a predefined protocol, and the parameter set for the predefined protocol is sent and mapped in the second switching node or a further switching node to a parameter set for the protocol used for the control of the second base station subsystem.

12. The method of claim 1, wherein the first message and the second message are the same message.

13. A switching node for a mobile communications system, the mobile communications system having further switching nodes and user equipment connectable to base station subsystems according to different connection specifications, the switching node comprising:

means for the control of a first base station subsystem and a first interface for connection to the first base station subsystem with a protocol corresponding to the connection specification used on the interface between the base station subsystem and the user equipment;

a second interface for the exchange of messages with the further switching nodes in a handover procedure of the user equipment from the first base station subsystem to a second base station subsystem which is controlled by one of the further switching nodes, at least one message of the messages encapsulating a parameter set for the connection protocol between the second base station subsystem and the further switching node;

means to generate the parameter set from a first message which is transmitted from the user equipment;

means to detect out of a second message transmitted from the user equipment whether the user equipment is capable of connections according to different connection specifications on the interface to a base station subsystem; and means to select the parameter set encapsulated in at least one message to the further switching node according to the protocol for the connection of the further switching node to the base station subsystem to which the handover procedure of the user equipment is performed.

14. The switching node according to claim 13, wherein the switching node further comprises means to generate parameter sets for different protocols, and a memory to store the parameter sets.

15. The switching node according to claim 13, wherein the switching node further comprises means to generate parameter sets from the first message transmitted from the user equipment, or means to map the parameter set for one protocol to a parameter set for a different protocol.

16. The switching node according to claim 13, wherein the switching node comprises means to encapsulate a parameter set for a first connection specification into a message for a second connection specification.

17. The switching node according to claim 13, wherein the switching node comprises means to extract a parameter set for a first connection specification out of a message for a second connection specification.

18. The switching node of claim 13, wherein the first message and the second message are the same message.

19. A program unit on a data carrier or loadable into a switching node for the control of base station subsystems in a communication system, wherein the program unit can be executed in a handover of user equipment from a first base station subsystem to a second base station subsystem which is controlled by a second switching node, wherein the communication system comprises base station subsystems differing in connection specifications on the interface to the user equipment, and wherein the switching node controls a base station subsystem with a protocol corresponding to the connection specification for the interface between the base station subsystem and the user equipment, the program unit comprising:

means to exchange messages in a handover procedure with the second switching node, at least one message of the messages encapsulating a parameter set for the protocol; and means to generate the parameter set from a message which is transmitted from the user equipment to the switching node, the program unit checking from the message transmitted from the user equipment whether the user equipment is capable of connections according to different specifications, and the program unit selecting the parameter set encapsulated in the message to the second switching node according to the protocol for the connection of the second switching node to the base station subsystem to which the handover procedure of the user equipment is performed.

* * * * *